United States Patent [19]
Bertry et al.

[11] Patent Number: 5,998,536
[45] Date of Patent: Dec. 7, 1999

[54] AQUEOUS POLYORGANOSILOXANE EMULSION FOR THE COATING OF TEXTILES

[75] Inventors: Jean Louis Bertry; Marc Ladreyt, both of Lyons; Alain Pouchelon, Meyzieu; Chris Street, La Mulatiere, all of France

[73] Assignee: Rhone-Poulenc Chimie, Courbevoie Cedex, France

[21] Appl. No.: 08/710,120

[22] Filed: Sep. 12, 1996

[30] Foreign Application Priority Data

Sep. 14, 1995 [FR] France ..................... 95 11002

[51] Int. Cl.⁶ ........................................ C08L 29/04
[52] U.S. Cl. .................. 524/557; 524/588; 524/559
[58] Field of Search ...................... 524/588, 557, 524/559

[56] References Cited

U.S. PATENT DOCUMENTS

| | | | |
|---|---|---|---|
| 5,070,132 | 12/1991 | Peccoux et al. | 524/588 |
| 5,399,402 | 3/1995 | Inoue et al. | 528/15 |

FOREIGN PATENT DOCUMENTS

| | | |
|---|---|---|
| 0169098 | 1/1986 | European Pat. Off. . |
| 0253747 | 1/1988 | European Pat. Off. . |
| 0350413 | 1/1990 | European Pat. Off. . |
| 0484001 | 5/1992 | European Pat. Off. . |
| 0552983 | 7/1993 | European Pat. Off. . |
| 0572006 | 12/1993 | European Pat. Off. . |
| 0663468 | 7/1995 | European Pat. Off. . |

*Primary Examiner*—Melvyn I. Marquis
*Attorney, Agent, or Firm*—Burns, Doane, Swecker & Mathis, L.L.P.

[57] ABSTRACT

The aqueous polyorganosiloxane emulsion, in particular for the coating of textiles or similar materials, which comprises an organopolysiloxane formula which is a precursor of the elastomer comprising a polydiorganosiloxane, preferably an inorganic filler, a catalyst and optionally a crosslinking agent, in the absence of surfactant in this formula, is characterized in that the organopolysiloxane formula is in emulsion in an aqueous protective hydrocolloid solution and in that this emulsion is obtained by direct emulsification of the complete organopolysiloxane formula in the aqueous protective hydrocolloid solution. The protective hydrocolloid is preferably a poly(vinyl alcohol) (PVA) or a PVA mixture.

Preparation method relating thereto, coating process using these emulsions and products thus coated.

44 Claims, No Drawings

AQUEOUS POLYORGANOSILOXANE EMULSION FOR THE COATING OF TEXTILES

BACKGROUND OF THE DISCLOSURE

1. Field of the DISCLOSURE

The present invention relates to an aqueous polyorganosiloxane emulsion, in particular for the coating of substrates made of textiles or the like, such as for example woven or non-woven supports, intended to produce an elastomer as a thin film, as well as to a corresponding coating process and to the products thus coated.

2. Description of the Prior Art

In many applications, the aim is to protect the textile from heat, from fire or from other assaults by a silicone elastomer layer and/or to confer on it specific properties in certain applications (dielectric properties, for example). Mention may in particular be made, as applications, of the inflatable bags used for protecting the occupants of a vehicle, known as air bags, glass braids (sheaths made of glass fabric for thermal and dielectric protection for electrical wire), conveyor belts, fire-resistant or thermally-insulating fabrics, expansion joints (flexible sleeves for rendering pipework leakproof), tents, clothes, and the like.

In particular as regards inflatable bag, of air bag type, essential properties sought for are fire and temperature resistance, impermeability to gases, behaviour with respect to ageing, and good adhesion to the textile. See in particular French Patent FR-A-2,668,106.

Silicone linings are thus produced by coating the substrate and then curing (crosslinking) the composition in order to form the elastomer.

In certain applications, for reasons of economic competitiveness, attempts are being made to apply very fine silicone layers, which becomes difficult with a 100% silicone elastomer; for example, the minimum amount which can be deposited by conventional doctor-type techniques on a 235 or 470 dtex polyamide 6,6 fabric is of the order of 40 $g/m^2$, i.e. an average thickness of the order of 40 microns. To obtain smaller amounts, it. is necessary to resort to a silicone elastomer used in a solvent phase, which is not satisfactory from an industrial viewpoint, in particular because of environmental problems. Provision has also been made, for textile applications, for aqueous silicone oil emulsions which are noncrosslinking and without filler, which do not confer any thermo-resistance.

Neither do recent developments in filler-containing, aqueous silicone emulsions enable very low coating thicknesses to be obtained.

Thus, European Patent Application EP-A-0,535,649 provides a composition for lining inflatable bags of air bag type comprising an organopolysiloxane (A) in emulsion in water in the presence of an anionic emulsifier, an adhesion promoter (B) which is selected from the reaction product of an aminofunctional amine or a hydrolysate of the latter with an acid anhydride, an epoxyfunctional silane or a hydrolysate of the latter and/or an organosilane having an isocyanate radical and a hydrolysable radical or a hydrolysate of the latter, a colloidal silica (C) and a catalyst (D). The objective of this composition is to make possible linings with a thickness ranging from 40 to 100 µm. Linings of approximately 100 µm are mentioned.

Likewise, European Patent Application EP-A-0,552,983 describes a composition of the same type, obtained from an organopolysiloxane (A) having at least two alkenyl groups, from an organohydropolysiloxane (B) having at least three hydrogen atoms and a crosslinking catalyst (C), by emulsification in water in the presence of an emulsifier. A reinforcing filler, such as a colloidal silica, can be added. The objective, here again, is to make possible linings with a thickness of 40 to 100 µm. A lining of approximately 100 µm is mentioned.

SUMMARY OF THE DISCLOSURE

The objective of the present invention is to provide a new composition and a new technique which make it possible to obtain linings, the deposition weight of which is less than 40 $g/m^2$, that is to say with a thickness of less than approximately 40 µm, in particular with a deposited weight of between 5 and 40 $g/m^2$ (between 5 and 40 µm approximately in thickness), which can be made use of in the field of textile coating, in particular inflatable bags of air bag type, glass braids, conveyor belts, fire resistant or thermally-insulating fabrics, expansion joints, tents or clothes.

Another objective of the invention is to be applicable to silicone elastomer compositions in general, in particular those which can be cold-vulcanized or optionally vulcanized at a high temperature, whether they are mono- or multicomponent or alternatively polyaddition or polycondensation compositions.

Another objective of the invention is to provide such compositions and techniques which are easy and inexpensive to implement and which additionally make possible, in the case of a thinner lining than ordinary, a not insignificant saving in material.

Another objective of the invention is therefore to enable the amount of silicone material for a given application to be reduced, without harming the characteristics of the final product.

A subject of the present invention is therefore an aqueous polyorganosiloxane emulsion, in particular for the coating of textiles or similar materials, in particular fabrics of the type described above, comprising an organopolysiloxane formula which is a precursor of the elastomer comprising a polydiorganosiloxane, preferably an inorganic filler, a catalyst and optionally a crosslinking agent but lacking a surfactant, characterized in that the organopolysiloxane formula is in emulsion in an aqueous protective hydrocolloid solution and in that this emulsion is obtained by direct emulsification of the complete organopolysiloxane formula in the aqueous protective hydrocolloid solution. Protective hydrocolloid is understood to mean a polymer possessing both hydrophilic groups and groups which are compatible with the silicone phase.

DETAILED DESCRIPTION OF THE PREFERRED EMBODIMENTS

The protective hydrocolloid is preferably a poly(vinyl alcohol) (PVA) or a PVA mixture and preferentially the PVA, in aqueous solution, has a dynamic-type viscosity ($\eta_{dt}$) of between 5 and 40 mPa·s, preferably between 10 and 30 mPa·s, and an ester number greater than or equal to 80, preferably greater than or equal to 100 and in particular of between 120 and 200.

Poly(vinyl alcohols) (PVA) are compounds obtained indirectly from their esters, by hydrolysis in aqueous medium or by alcoholysis in anhydrous medium. In practice, the esters used as starting material are commonly poly(vinyl acetate)s. Generally, lysis of the esters resulting in the PVAs is incomplete. Acyl radicals remain in the molecule, the proportion of which radicals influences the properties of the PVA, in particular its solubility. One way of defining PVAs is therefore based on the indication of the ester number (E.N.), which is inversely proportional to the degree of hydrolysis. The E.N. is measured in a way known per se, by neutralization of the possible acidity of the poly(vinyl alcohol), saponification of the acyl groups and titrating the excess basicity.

The polyvinyl alcohol)s according to the invention are also characterized by their degree of condensation, which may be evaluated by determining the dynamic viscosity of a typical solution (denoted by $\eta_{dt}$ in the present statement), it being known that this variable increases as the degree of condensation increases.

The viscosity $\eta_{dt}$ corresponds to the dynamic viscosity coefficient of a 4 weight % aqueous PVA solution, measured at a temperature of 20±5° C. using an Ostwald viscometer.

Mention may also be made, as other protective hydrocolloid, of water-dispersible sulphonated polyesters, in particular of sulphonated poly(ethylene terephthalate) type.

Water-dispersible sulphonated polyesters are known products which are commercially available. They can be prepared by co-condensation of an organic diacid (such as a saturated or unsaturated aliphatic diacid, an aromatic diacid, a diacid exhibiting a number of aromatic rings or an arylaliphatic diacid), one of its diesters or its anhydride and of a sulphonated organic, diacid or one of its diesters with a diol, in the presence of a conventional polyesterification catalyst, such as tetraisopropyl orthotitanate.

Mention may be made, as starting monomers commonly used for the preparation of water-dispersible sulphonated polyesters, of:

- as organic diacids: saturated or unsaturated aliphatic diacids, aromatic diacids, such as siccinic, adipic, suberic and sebacic acids, maleic, fumaric and itaconic acids and ortho-phthalic, isophthalic and terephthalic acids, the anhydrides of these acids and their diesters, such as methyl, ethyl, propyl and butyl diesters. The preferred compounds are adipic acid and ortho-phthalic, isophthalic and terephthalic acids;
- as sulphonated organic diacids: sodium sulphonate diacids or their diesters, such as dialkyl isophthalates and dialkyl sulphosuccinates, for example the sodium salt of dimethyl 5-sulphoisophthalate or the sodium salt of dimethyl sulphosuccinate;
- as diols: aliphatic glycols, such as ethylene glycol, diethylene glycol, dipropylene glycol a:nd higher homologues, 1,4-butanediol, 1,6-hexanediol, neopentyl glycol and cycloaliphatic glycols, such as cyclohexanediol or dicyclohexanediolpropane. The preferentially selected diols are ethylene glycol and diethylene glycol.

The preferred water-dispersible sulphonated polyesters are those which have a number-average molecular mass of between 10,000 and 35,000, an acid number of less than 5 mg of KOH/g and a sulphur level of between 0.8 and 2 weight %, preferably between 1.2 and 1.8%. Use may in particular be made, as polyesters of this type, of the product sold by Rhône-Poulenc under the trade name Gerol PS20.

A silicone phase/hydrocolloid phase ratio will preferably be selected so as to have a solids content ratio of between 10 and 60, and preferably between 40 and 60.

The aqueous protective hydrocolloid solution can additionally comprise at least one surfactant which can be anionic, cationic or non-ionic, in particular a polyethoxylated fatty alcohol. It is understood that, in the case of the use of a polyester, the person skilled in the art will exclude cationic surfactants. The surfactants will preferably be nonionic. The surfactant/hydrocolloid ratio is in particular between 0 and 10%. The role of a surfactant will be in particular to improve the particle size distribution of the emulsion and optionally to improve its stability.

The invention makes it possible to prepare an aqueous emulsion in the presence or in the absence of an inorganic filler and very advantageously in the absence of surfactant, which makes it possible to obtain a preparation capable of being applied as a very thin layer, in particular with a thickness of less than 40 µm, for example between 5 and 40 µm, while providing the elastomer formed with good properties compatible in particular with the abovementioned uses. The macromolecule (hydrocolloid) additionally has the advantage of increasing the attachment of the elastomer to the fabric, like an adhesive, and conferring an additional ability to render impermeable to gas, which are particularly advantageous in air bag applications.

The polyorganosiloxane formula according to the invention comprises the polyorganosiloxane or polyorganosiloxanes which will generate the elastomer. It is preferably a formula which is curable at room temperature (23° C.) and for which the crosslinking can be accelerated with a high temperature. It therefore preferably concerns so-called cold-vulcanizable polyaddition or polycondensation elastomers. Hot-vulcanizable elastomers also come within the scope of the invention.

As is known, silicone elastomers can be prepared from a 2-component precursor system formed from two separate parts intended to be mixed. Once combined, the reactive compounds of the two parts can react and crosslinking can take place. For such systems, emulsion according to the present invention arises from the combination of two separate emulsions, each prepared by direct emulsification of the corresponding formula part.

The subject of the present invention is therefore also a kit comprising the two emulsions, each corresponding to a part of the polyorganosiloxane formula, these two emulsions being prepared by direct emulsification of the formula part in its aqueous protective hydrocolloid solution portion.

However, single-component compositions also come within the scope of the invention and in particular polyaddition or polycondensation compositions designed only to crosslink under the effect of an external agency, as is known per se. For example, these single-component compositions can comprise a conventional crosslinking inhibitor or encapsulated catalysts, in a way known per se. Thus, in all cases where it is possible to combine all the components within a single formula, a single emulsion will be used.

The curable organopolysiloxane compositions which can be used in the context of the process according to the present invention contain a main constituent: preferably formed from one or a number of policrganosiloxanes, preferably polydimethylsiloxane (PDMS), from an appropriate catalyst, from at least one filler, from a crosslinking agent, according to the situation, and optionally from an adhesion promoter.

The organopolysiloxanes, the main constituents of the compositions according to the invention, can be linear, branched or crosslinked and can contain hydrocarbon radicals and/or reactive groups, such as, for example, hydroxyl groups, hydrolysable groups, alkenyl groups, hydrogen atoms, and the like. It should be noted that the organopolysiloxane compositions are fully described in the literature and in particular in the work by Walter Noll: "Chemistry and Technology of Silicones", Academic Press, 1968, 2nd edition, pages 386 to 409.

More precisely, the organopolysiloxanes which are the main constituents of the compositions according to the invention are composed of siloxy units of general formula:

$$R_n SiO_{\frac{4-n}{2}} \quad (II)$$

and/or of siloxy units of formula:

$$Z_x R_y SiO_{\frac{4-x-y}{2}} \quad (III)$$

In the formulae, the various symbols have the following meaning:
the R symbols, which are identical or different, each represent a non-hydrolysable group of hydrocarbon nature, it being possible for this radical to be:
an alkyl or haloalkyl radical having from 1 to 5 carbon atoms and containing from 1 to 6 chlorine and/or fluorine atoms,
cycloalkyl and halocycloalkyl radicals having from 3 to 8 carbon atoms and containing from 1 to 4 chlorine and/or fluorine atoms,
aryl, alkylaryl and haloaryl radicals having from 6 to 8 carbon atoms and containing from 1 to 4 chlorine and/or fluorine atoms,
cyanoalkyl radicals having from 3 to 4 carbon atoms;
the Z symbols, which are identical or different, each represent a hydrogen atom, an alkenyl group, a hydroxyl group, a hydrolysable atom or a hydrolysable group;
n=an integer equal to 0, 1, 2 or 3;
x=an integer equal to 0, 1, 2 or 3;
y=an integer equal to 0, 1 or 2;
the sum x+y is between 1 and 3.

Mention may be made, by way of illustration, of organic radicals R directly bonded to the silicon atoms: methyl, ethyl, propyl, isopropyl, butyl, isobutyl, n-pentyl, t-butyl, chloromethyl, dichloromethyl, α-chloroethyl, α,β-dichloroethyl, fluoromethyl, difluoromethyl, α,β-difluoroethyl, 3,3,3-trifluoropropyl, trifluorocyclopropyl, 4,4,4-trifluorobutyl, 3,3,4,4,5,5-hexafluoropentyl, β-cyanoethyl, γ-cyanopropyl, phenyl, p-chlorophenyl, m-chlorophenyl, 3,5-dichlorophenyl, trichlorophenyl, tetrachlorophenyl, o-, p- or m-tolyl, α,α,α-trifluorotolyl or xylyls, such as 2,3-dimethylphenyl or 3,4-dimethylphenyl, groups.

The R organic radicals bonded to the silicon atoms are preferentially methyl or phenyl radicals, it being possible for these radicals optionally to be halogenated, or alternatively cyanoalkyl radicals.

The Z symbols can be hydrogen atoms, hydrolysable atoms, such as halogen atoms, in particular chlorine atoms, vinyl or hydroxyl groups or hydrolysable groups, such as: amino, amido, aminoxy, oxime, alkoxy, alkenyloxy, acyloxy, and the like.

The nature of the organopolysiloxane and thus the ratios of the siloxy units (II) and (III) to one another and the distribution of these is, as is known, selected according to the crosslinking treatment which will be carried out on the curable (or vulcanizable) composition for the purpose of converting it to an elastomer.

It is possible to use a wide variety of single-component or two-component compositions which crosslink by polyaddition or polycondensation reactions in the presence of a metal catalyst and optionally of a crosslinking agent and/or of an amine.

Two-component or single-component organopolysiloxane compositions which crosslink at room temperature or with heat by polyaddition reactions, essentially by reaction of hydrosilyl groups with alkenylsilyl groups, generally in the presence of a metal catalyst, preferably a platinum catalyst, are described, for example, in U.S. Pat. Nos. 3,220,972, 3,284,406, 3,436,366, 3,697,473 and 4,340,709. The organopolysiloxanes which form part of these compositions are generally composed of pairs based, on the one hand, on at least one linear, branched or crosslinked polysiloxane composed of (III) units in which the Z residue represents an alkenyl group and where x is at least equal to 1, optionally in combination with (II) units, and, on the other hand, of at least one linear, branched or crosslinked hydropolysiloxane composed of (III) units in which the Z residue then represents a hydrogen atom and where x is at least equal to 1, optionally in combination with (II) units. As regards the unsaturated polysiloxane constituent containing (III) units, it can be an oil with a dynamic viscosity at 25° C. of between 200 and 500,000 mPa·s. If necessary, use may be made, as this constituent, of a mixture based on the abovementioned oil with an unsaturated gum with a viscosity greater than 500,000, which can range up to $10^6$, mPa·s.

Two-component or single-component organopolysiloxane compositions which crosslink at room temperature by polycondensation reactions under the effect of moisture, generally in the presence of a metal catalyst, for example a tin compound, are described, for example for single-component compositions, in U.S. Pat. Nos. 3,065,194, 3,542,901, 3,779,986 and 4,417,042 and in Patent FR-A-2, 638,752 and, for two-component compositions, in U.S. Pat. Nos. 3,678,002, 3,888,815, 3,933,729 and 4,064,096. The organopolysiloxanes which form part of these compositions are generally linear, branched or crosslinked polysiloxanes composed of (III) units in which the Z residue is a hydroxyl group or a hydrolysable atom or group and where x is at least equal to 1, with the possibility of having at least one Z residue which is equal to a hydroxyl group or to a hydrolysable atom or group, the said (III) units optionally being combined with (II) units. As regards the unsaturated polysiloxane constituent containing (III) units, it can be an oil with a dynamic viscosity at 25° C. of between 200 and 500,000 mPa·s. Similar compositions can additionally contain a crosslinking agent which is in particular a silane carrying at least three hydrolysable groups, such as, for example, a silicate, an alkyltrialkoxysilane or an aminoalkyltrialkoxysilane.

In an entirely preferred way, the polycondensation compositions additionally contain at least one silicone resin. These silicone resins are well known branched organopolysiloxane polymers which are commercially available. They exhibit, per molecule, at least two different units selected from those of formula $R_3SiO_{0.5}$ (M unit), $R_2SiO$ (D unit), $RSiO_{1.5}$ (T unit) and $SiO_2$ (Q unit).

The R radicals are identical or different and are selected from linear or branched alkyl radicals or vinyl, phenyl or 3,3,3-trifluoropropyl radicals. The alkyl radicals preferably exhibit from 1 to 6 carbon atoms inclusive. More particularly, mention may be made, as R is alkyl radicals, of methyl, ethyl, isopropyl, tert-butyl and n-hexyl radicals.

These resins are preferably hydroxylated and have, in this case, a hydroxyl group content by weight of between 5 and 500 meq/100 g.

Mention may be made, as examples of resins, of the MQ resins, the MDQ resins, the TD resins and the MDT resins.

Likewise, the polyaddition compositions can also contain non-hydroxylated resins of the abovementioned type in which some of the R radicals are vinyl residues (Vi content by weight in particular of between 10 and 40 meqVi/100 g). These vinyl functional groups are carried by M, D or T units. Mention may be made, as an example, of vinylated MDQ resins.

The inorganic fillers are preferably selected from combustion silicas and precipitation silicas. They have a specific surface, mentioned according to the BET methods, of at least 50 m²/g, in particular between 50 and 400 m²/g, preferably greater than 70 m²/g, a mean size of the primary particles of less than 0.1 micrometer (μm) and an apparent density of less than 200 g/liter.

These silicas can be incorporated as such and then can optionally be treated with one or more organosilicon compound commonly used for this purpose. These silicas can also be incorporated after treatment with such an organosilicon compound. Methylpolysiloxanes, such as hexamethyldisiloxane or octamethylcyclotetrasiloxane, methylpolysilazanes, such as hexamethyldisilazane or hexamethylcyclotrisilazane, chlorosilanes, such as dimethyldichlorosilane, trimethylchlorosilane, methylvinyldichlorosilane or dimethylvinylchlorosilane, alkoxysilanes, such as dimethyldimethoxysilane, dimethylvinylethoxysilane or trimethylmethoxysilane, figure among these compounds. During this treatment, these silicas can increase their starting weight up to a level of 20%.

Other inorganic fillers, such as ground. quartz, calcined clays and diatomaceous earths, can also be used in addition to or in place of siliceous fillers.

As regards the non-siliceous inorganic materials, they can act as a semi-reinforcing or bulking inorganic filler or as an inorganic filler with specific properties. Examples of these non-siliceous fillers which can be used alone or as a mixture are carbon black, titanium dioxide, aluminium oxide, hydrated alumina, expanded vermiculite, unexpanded vermiculite, calcium carbonate, zinc oxide, mica, talc, iron oxide, barium sulphate and slaked lime. These fillers have a particle size distribution generally of between 0.001 and 300 μm and a BET specific surface of less than 100 m²/g.

It is generally possible to use from 0.5 to 50 weight %, preferably from 10 to 25 weight %, of filler with respect to the weight of the silicone phase of the formula.

Preferentially, the organopolysiloxane formula additionally comprises one or a number of adhesion promoters. They can be promoters which are conventionally used.

However, in the case of the polyaddition formulae, the adhesion promoters are in particular selected from the group formed by:
- alkoxylated organosilanes containing, per molecule, at least one $C_2$–$C_6$ alkenyl group,
- organosilicon compounds comprising at least one epoxy radical, and
- chelates of metals M and/or metal alkoxides of general formula: $M(OJ)_n$, with n=valency of M and J=linear or branched $C_1$–$C_8$ alkyl, M being selected from the group formed by: Ti, Zr, Ge, Li, Mn, Fe, Al, Mg.

It can in particular concern an adhesion promoter mixture comprising at least one compound selected from the three groups defined above.

In accordance with a preferred arrangement of the invention, the alkoxylated organosilane is more particularly selected from the products of the following general formula:

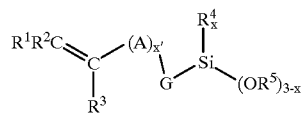

in which:
$R^1$, $R^2$ and $R^3$ are hydrogen or hydrocarbon radicals which are identical or different and preferably represent hydrogen, a linear or branched $C_1$–$C_4$ alkyl or a phenyl optionally substituted by at least one $C_1$–$C_3$ alkyl,
A is a linear or branched $C_1$–$C_4$ alkylene,
G is a valence bond or oxygen,
$R^4$ and $R^5$ are identical or different radicals and represent a linear or branched $C_1$–$C_4$ alkyl,
x'=0 or 1,
x=0 to 3, preferably 0 or 1 and more preferentially still 0.

Without this being limiting, vinyltrimethoxysilane may be regarded as a particularly appropriate compound (IV).

As regards the organosilicon compound, it is anticipated, in accordance with the invention, preferentially to select it:
either from the products corresponding to the following general formula:

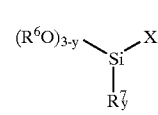

in which:
a. $R^6$ is a linear or branched $C_1$–$C_4$ alkyl radical,
b. $R^7$ is a linear or branched alkyl radical,
c. y is equal to 0, 1, 2 or 3, preferably to 0 or 1 and, more preferentially still, to 0,

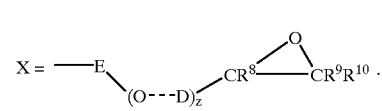

with
E and D being identical or different radicals selected from linear or branched $C_1$–$C_4$ alkyls,
z being equal to 0 or 1,
$R^8$, $R^9$ and $R^{10}$, which are identical or different radicals, representing hydrogen or a linear or branched $C_1$–$C_4$ alkyl, hydrogen being more particularly preferred,
it alternatively being possible for $R^8$ and $R^9$ or $R^{10}$, together with the two carbon atoms carrying the epoxy, to form an alkyl ring having from 5 to 7 members,
or from the products composed of epoxyfunctional polyorganosiloxanes containing at least one unit of formula:

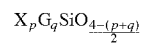

in which:
X is the radical as defined above for the formula V,
G is a monovalent hydrocarbon group which has no unfavourable effect on the activity of the catalyst and which is preferably selected from alkyl groups having from 1 to 8 carbon atoms inclusive, optionally substituted by at least one halogen atom, advantageously from methyl, ethyl, propyl and 3,3,3-trifluoropropyl groups, and from aryl groups and, advantageously, from xylyl, tolyl and phenyl radicals, p=1 or 2,
q=0, 1 or 2,
p+q=1, 2 or 3, optionally at least some of the other units of these polydiorganosiloxanes are units of average formula:

$$G_r SiO_{\frac{4-r}{2}} \quad \text{VII}$$

in which G has the same meaning as above and r has a value of between 0 and 3, for example between 1 and 3.

The organosilicon compounds are thus preferentially epoxyalkoxysilicon compounds and more preferentially still epoxyalkoxymonosilane compounds.

Mention may be made, as an example of such compounds, of:

3-glycidoxypropyltrimethoxysilane (GLYMO)
or 3,4-epoxycyclohexylethyltrimethoxysilane.

As regards the final group, the preferred products are those in which the metal M is selected from the following list: Ti, Zr, Ge, Li or Mn. It should be emphasized that titanium is more particularly preferred.

It may be combined, for example, with an alkyl radical of butyl type.

As regards the polycondensation compositions, use may advantageously be made as adhesion promoters, of compounds belonging to the family of aminosilanes, such as aminoorganosilanes, aminoorganopolysiloxanes and guanidinoorganosilanes carrying, per molecule, both: (i) at least one $C_3$–$C_{15}$ organic group bonded via an SiC bond to the silicon atom and substituted by at least one amino radical or one guanidino radical and (ii) at least one $C_1$–$C_6$ alkoxy radical or one $C_3$–$C_6$ alkoxyalkylenoxy radical. Mention may in particular be made of the silanes of formula:

$H_2N(CH_2)_3Si(OCH_3)_3$
$H_2N(CH_2)_3Si(OC_2H_5)_3$
$H_2N(CH_2)_2NH(CH_2)_3Si(OCH_3)_3$

It may also be epoxidized silanes (organosilicon compounds having at least one epoxy radical) as described above for the polyaddition compositions.

For more details on the synthesis of the organosiloxanes (a') and on their use in preparing single-component organopolysiloxane compositions which crosslink at room temperature by polycondensation reactions under the effect of moisture, reference may be made very particularly to Patent FR-A-2,638,752, the contents of which are incorporated here by reference.

The preferred polyaddition formulae are generally a combination:

of 0 to 80% of a colloidal silica dispersion in a divinylated silicone oil. The silica is a reinforcing filler with a specific surface of between 50 and 400 $m^2/g$; there is between 10 and 60% of it in the dispersion.

of 10 to 90% of an α,ω-divinylated oil, the vinyl group content of which is between 2 and 100 meq/100 g.

of 0 to 10% of an α,ω-dihydro oil, the hydro group content of which is between 30 and 300 meq/100 g.

of 1 to 10% of a polyhydro oil, the hydro group content of which is between 100 and 1600 meq/100 g.

preferably an adhesion promoter:
of 0 to 5% of a mixture of silanes selected from the unsaturated and epoxidized range;
of 0 to 3% of a metal chelate and/or of a metal alkoxide;
of a polyaddition catalyst in the proportion of 2 to 50 ppm of platinum;
optionally a polyorganosiloxane resin having vinyl residues, in particular a resin of MDQ structure.

The preferred polycondensation formulae are generally a combination:

of 0 to 80% of a colloidal silica dispersion in a hydroxylated silicone oil. The silica is a reinforcing filler with a specific surface of between 50 and 400 $m^2/g$; there is between 10 and 50% of it in the dispersion.

of 10 to 90% of an α,ω-dihydroxylated oil, the hydroxyl group content of which is between 1 and 20 meq/100 g.

of 10 to 40% of an MQ resin, the hydroxyl group content of which is between 30 and 200 meq/100 g.

preferably an adhesion promoter:
of 0 to 5% of a silane selected from the amino and epoxidized range;
of 1 to 10% of a polycondensation catalyst.

Another subject of the present invention is a method for the preparation of an aqueous polyorganosiloxane emulsion of the type described above, in which the polyorganosiloxane formula which is a precursor of the elastomer, comprising a polydiorganosiloxane, preferably an inorganic filler, a catalyst and optionally a crosslinking agent, is prepared and is then emulsified in an aqueous protective hydrocolloid solution. In the case of a two-component precursor formula, each formula part, prepared beforehand, is emulsified in its aqueous protective hydrocolloid solution portion and the emulsions obtained are then stored separately. If necessary, the emulsion can be improved by a means known per se, such as a mill.

Another subject of the present invention is a process for coating a textile or similar material, using an aqueous polyorganosiloxane emulsion as defined above, generally by emulsification of a polyorganosiloxane formula as described above or as obtained by the above method, in which process a layer of the emulsion is applied to one or both faces of the textile and crosslinking is then carried out, so as to obtain a textile lined, on at least one of its faces, with an elastomer layer, preferably of less than 40 $g/m^2$, in particular of between 5 and 40 $g/m^2$. In the case of a two-component emulsion, the process comprises a preliminary stage consisting of the mixing of the two components.

The coating stage can in particular be carried out with a doctor, in particular with a doctor over a cylinder, a floating doctor and a doctor over a belt, or by padding, that is to say by squeezing between two rollers, or alternatively with e printing roll (in French: rouleau lécheur), a rotary screen, a reverse roll, transfer or spraying.

It is possible to coat one or both faces of the textile, the coating of both faces then advantageously being carried out by padding after impregnation of the fabric with the emulsion. For coating on both faces, by padding, the fabric is preferably vertically presented between the two rollers where the emulsion is continuously deposited. For coating on a single face by padding, the tissue is rather presented horizontally between the rollers. After passing between the rollers, the fabric is uniformly coated with a fine layer of emulsion. Drying and crosslinking, preferably by hot air or infrared radiation, are then carried out, in particular for 30 s to 5 min, at a crosslinking temperature not exceeding the degradation temperature of the substrate.

The doctor is intended for coating a single face. The emulsion is continuously deposited on the upper face of the fabric and then passes under the doctor, before drying and crosslinking as above.

Another subject of the present invention is textiles or similar materials coated in accordance with the present invention. A subject of the present invention is in particular inflatable bags of air bag type, glass braids, conveyor belts, fire-resistant or thermally-insulating fabrics, expansion joints, tents and clothes, coated in accordance with the invention.

The invention will now be described in more detail using non-limiting implementation examples.

Coating Process a) With a doctor over a cylinder.

The doctor is adjusted to the minimum thickness (between 0 and 5 μm) above the fabric at which the latter can just pass between the doctor and the cylinder. Emulsion is continuously deposited on the upper face of the fabric before passing under the doctor. The fabric then passes into an oven for 1 minute at 150° C.

b) By padding (squeezing between two rollers)

The pressure of the rollers is adjusted to 2 bars. The fabric either arrives vertically between the rollers where the emulsion is continuously deposited, the fabric ending up impregnated on both its faces on leaving the rollers, or the fabric arrives horizontally between the rollers and the emulsion is continuously deposited on the upper face of the fabric which ends up coated on a single face after passing between these rollers. The fabric then passes into an oven for 1 minute at 150° C.

The fabrics are weighed before and after coating in order to measure the weight deposited.

Validation of Good Crosslinking and of Adhesion to Fabric After Coating.

As a first approximation, it is checked whether the coated fabric has a dry feel after drying on removal from the oven. The level of crosslinking and of adhesion of the elastomeric lining are then simultaneously evaluated by a creasing test according to NF standard G 37 110 (behaviour on creasing or scrub test). The crosslinking and the adhesion are correct if 200 creasings are achieved.

POLYADDITION EXAMPLE

I—In the Presence of a Filler

Preparation of the parts A and B of the elastomer.

This operation is carried out in a laboratory arm mixer. The following are mixed:

part A
- 505 g of a 30 weight % dispersion of hydrophobic colloidal silica in silicone oil; the silica has a specific surface of 300 m$^2$/g; the α,ω-divinylated oil assays 15 meq Vi/100 g
- 417.6 g of α,ω-divinylated oil which assays 7 meq Vi/100 g
- 25.2 g of α,ω-dihydro oil which assays 190 meq H/100 g
- 40.5 g of polyhydro oil which assays 160 meq H/100 g
- 11.1 g of vinyltrimethoxysilane
- 0.6 g of ethynylcyclohexanol part B
- 521.7 g of a 30 weight % dispersion of hydrophobic colloidal silica in silicone oil; the silica has a specific surface of 300 m$^2$/g and the α,ω-divinylated oil assays 15 meq Vi/100 g
- 431 g of α,ω-divinylated oil which assays 7 meq Vi/100 g
- 45 g of butyl titanate
- 2.3 g of platinum catalyst which assays 12 weight % of platinum.

Emulsification of the parts A and B of the elastomer

Emulsification takes place in a laboratory reactor, the silicone phase being run into half of its weight of poly(vinyl alcohol) solution. After mixing, the formula is brought to completion with the remainder of the water. Stirring is continued in order to improve the emulsion.

emulsion A
- 500 g of part A
- 475 g of water
- 25 g of PVA 25/140, that is to say with a viscosity of 25 and with an ester number of 140, sold by Rhône-Poulenc under the trade name Rhodoviol.

emulsion B
- 500 g of part B
- 475 g of water
- 25 g of PVA 25/140

Implementation

The emulsions A and B are combined at the time of use in the proportion of:
- 100 g of emulsion A
- 10 g of emulsion B II—In the Absence of Filler Preparation of the parts A and B of the elastomer reinforced with a silicone resin part A
- 300 g of α,ω-divinylated oil containing 3 meq Vi/100 g
- 150 g of α,ω-divinylated oil containing 5 meq Vi/100 g
- 480 g of vinylated polysiloxane resin containing 22 meq Vi/100 g with a viscosity of 3.8 Pa·s
- 50 g of polyhydro oil containing 690 meq H/100 g
- 10 g of vinyltrimethoxysilane
- 10 g of γ-glycidoxypropyltrimethoxysilane
- 0.25 g of ethynylcyclohexanol part B
- 363 g of α,ω-divinylated oil containing 3 meq Vi/100 g
- 145 g of α,ω-divinylated oil containing 5 meq Vi/100 g
- 446 g of vinylated polysiloxane resin containing 22 meq Vi/100 g with a viscosity of 3.8 Pa·s
- 40 g of butyl titanate
- 1.8 g of catalyst which assays 12% of platinum Emulsification As in I, with
- 500 g of part A
- 485 g of water
- 15 g of PVA
- 500 g of part B
- 485 g of water
- 15 g of PVA Implementation:

Mixing in the proportion of 100 g of emulsion A+10 g of emulsion B

Results of the Test on Polyamide Fabric:

With 22 g/m$^2$ deposited: 400 creasings

POLYCONDENSATION EXAMPLE

Preparation of the Parts A and B of the Elastomer

This operation is carried out in a laboratory arm mixer. The following are mixed:

part A
　500 g of a 35 weight % dispersion of hydrophobic colloidal silica in silicone oil;
　the silica has a specific surface of 300 m²/g; the hydroxylated oil assays 2 meq OH/100 g
　375 g of α,ω-dihydroxy oil which assays 5 meq OH/100 g
　125 g of an MQ silicone resin which assays 55 meq OH/100 g part B
　1000 g of dioctyltin dilaurate Emulsification of the Parts A and B of the Elastomer Emulsification takes place in a laboratory reactor, the silicone phase being run into half of its weight of poly(vinyl alcohol) solution. After mixing, the formula is brought to completion with the remainder of the water. Stirring is continued in order to improve the emulsion.

emulsion A
　500 g of part A
　475 g of water
　25 g of PVA 25/140 emulsion B
　500 g of part B
　480 g of water
　20 g of PVA 25/140

Implementation

The emulsions A and B are combined at the time of use in the proportion of:
　100 g of emulsion A
　5 g of emulsion B Results Three coating processes were used:
　DC: doctor over a cylinder
　IP: impregnation by padding
　BC: coating one face with a cylinder (padding variant)

1) On Desized 21×21 Yarns/cm 470 dtex Polyamide 6,6 Fabric with:
PA=polyaddition formula of the above examples
PC=polycondensation formula of the above example (with filler) Crosslinking: 1 min at 150° C.

| Process | DC | IP | BC | DC | DC |
|---|---|---|---|---|---|
| Emulsion | PA | PA | PA | PC | PA |
| Feel | dry | dry | dry | dry | dry |
| Weight deposited (g/m²) | 25 | 20 | 20 | 20 | 40 |
| No. of creasings | 500 | 200 | 200 | 200 | 600 |

The polyamide fabric is suitable for the manufacture of inflatable bags of air bag type. The results with the filler-containing emulsions according to the invention show that a product with a fine coating layer and which has properties compatible with the inflatable bag use is obtained.

2) On 230 g/m² Glass Fabric

| Process | DC |
|---|---|
| Emulsion | PA |
| Crosslinking | 1 min at 150° C. |
| Feel | dry |
| Weight deposited | 20 g/m² |
| Adhesion | good |

As the scrub test is not suitable for glass fabric, the adhesion is good when the lining is resistant to the effect of prolonged scraping using a metal spatula. In addition, the glass fabric can be cut without this fabric unweaving.

We claim:

1. An aqueous polyorganosiloxane emulsion suitable for the coating of textiles comprising:
　a silicone phase which is a precursor of an elastomer comprising at least one polydiorganosiloxane, optionally a crosslinking agent, optionally an inorganic filler, and a catalyst; and
　an aqueous, protective hydrocolloid solution,
　wherein the silicone phase does not contain any surfactant and the emulsion is obtained by direct emulsification of the silicone phase and the protective hydrocolloid solution.

2. The emulsion of claim 1, wherein the aqueous protective hydrocolloid solution comprises an aqueous poly(vinyl alcohol) solution.

3. The emulsion of claim 2, wherein the aqueous poly(vinyl alcohol) solution has a dynamic viscosity ($\eta_{dt}$) of between 5 and 40 mPa·s, and an ester number greater than or equal to 80.

4. The emulsion of claim 3, wherein the aqueous poly(vinyl alcohol) solution has a dynamic viscosity of between 10 and 30 mPa·s.

5. The emulsion of claim 3, wherein the aqueous poly(vinyl alcohol) solution has an ester number of greater than or equal to 100.

6. The emulsion of claim 3, wherein the aqueous poly(vinyl alcohol) solution has an ester number of between 120 and 200.

7. The emulsion of claim 1, wherein the protective hydrocolloid comprises a water dispersable sulphonated polyester.

8. The emulsion of claim 7, wherein the water dispersable sulphonated polyester has a number average molecular weight of between 10,000 and 35,000, an acid number of less than 5 mg of KOH/g and a sulphur level of between 0.8 and 2 weight %.

9. The emulsion of claim 8, wherein the water dispersable sulphonated polyester has a sulphur level of between 1.2 and 1.8 weight %.

10. The emulsion of claim 7, wherein the water dispersable sulphonated polyester is a sulphonated poly(ethylene terephthalate).

11. The emulsion of claim 1, wherein the silicone phase/aqueous protective hydrocolloid solution ratio is selected so as to have a solids content in the emulsion of between 10 and 60 weight %.

12. The emulsion of claim 11, wherein the silicone phase/aqueous protective hydrocolloid solution ratio is selected so as to have a solids content in the emulsion of between 40 and 60 weight %.

13. The emulsion of claim 1, wherein the aqueous protective hydrocolloid solution may additionally comprise a surfactant.

14. The emulsion of claim 13, wherein the surfactant is a non-ionic surfactant.

15. The emulsion of claim 13, wherein the surfactant is a polyethoxylated fatty alcohol.

16. The emulsion of claim 13, wherein the surfactant/protective hydrocolloid ratio is between 0 and 10%.

17. The emulsion of claim 1, wherein the polydiorganosiloxane is a cold vulcanizable polyaddition elastomer or a cold vulcanizable polycondensation elastomer.

18. The emulsion of claim 17, wherein the polydiorganosiloxane is a polyaddition or a polyconcensation elastomer and additionally comprises at least one polyorganosiloxane resin.

19. The emulsion of claim 18, wherein the polydiorganosiloxane comprises a cold vulcanizable polycondensation elastomer and the polyorganosiloxane resin is a hydroxylated polyorganosiloxane resin.

20. The emulsion of claim 1, wherein the silicone phase contains the inorganic filler and the inorganic filler is combustion silica or precipitated silica.

21. The emulsion of claim 20, wherein the silica has a BET surface area of at least 50 m$^2$/g, a mean primary particle size of less than 0.1 micrometer, and an apparent density of less than 200 g/l.

22. The emulsion of claim 21, wherein the silica has a BET surface area of between 50 and 400 m$^2$/g.

23. The emulsion of claim 20, wherein the silica has been treated with one or more organosilicon compounds.

24. The emulsion of claim 22, wherein the organosilicon compound is selected from the group consisting of methylpolysiloxanes, methylpolysilazanes, chlorosilanes, alkoxysilanes and mixtures thereof.

25. The emulsion of claim 24, wherein the organosilicon compound is selected from the group consisting of hexamethyldisiloxane, octamethylcyclotetrasiloxane, hexamethyldisilazane, hexamethylcyclotrisilazane, dimethyldichlorosilane, trimethylchlorosilane, methylvinyldichlorosilane, dimethylvinylchlorosilane, dimethyldimethoxysilane, dimethylvinylethoxysilane, and trimethylmethoxysilane.

26. The emulsion of claim 20, wherein the inorganic filler comprises combustion silica or precipitated silica and further comprises at least one additional inorganic filler.

27. The emulsion of claim 26, wherein the additional inorganic filler is ground quartz, calcined clay and diatomaceous earth.

28. The emulsion of claim 20, wherein the silicone phase comprises from 0.5 to 50 weight % inorganic filler with respect to the polydiorganosiloxane constituent.

29. The emulsion of claim 28, wherein the silicone phase comprises from 10 to 25 weight % inorganic filler with respect to the polydiorganosiloxane constituent.

30. The emulsion of claim 1, wherein the silicone phase additionally comprises at least one adhesion promotor.

31. The emulsion of claim 30, wherein the polydiorganosiloxane forms the elastomer by polyaddition and the adhesion promotor is one or more of:
  alkoxylated organosilanes containing at least one $C_2$–$C_6$ alkenyl group per molecule;
  organosilicon compounds comprising at least one epoxy radical;
  chelates of metals, M; or
  metal alkoxides of the formula M(OJ)$_n$, wherein n is the valence of M and J is a linear or branched $C_2$–$C_8$ alkyl;
  wherein M is Ti, Zr, Ge, Li, Mn, Fe, Al, or Mg.

32. The emulsion of claim 31, wherein the polydiorganosiloxane forms the elastomer by polycondensation and the adhesion promotor is one or more of aminosilanes or epoxidized silanes.

33. The emulsion of claim 32, wherein the adhesion promotor is one or more of aminoorganosilanes, aminoorganopolysiloxanes or guanidinoorganosilanes.

34. The emulsion of claim 1, wherein the polydiorganosiloxane forms the elastomer by polyaddition and the emulsion is formed from a mixture comprising:
  from 0 to 80 weight % of a dispersion of colloidal silica in a divinylated silicone oil, wherein the dispersion comprises 10 to 60 weight % silica;
  from 10 to 90 weight % of an α,ω-divinylated oil having a vinyl group content of between 2 and 100 meq/100 g;
  from 0 to 10 weight % of α,ω-dihydro oil having a hydro group content of between 30 and 300 meq/100 g;
  from 1 to 10 weight % of a polyhydro oil, the hydro group content of which is between 100 and 1600 meq/100 g;
  from 0 to 5 weight % of a mixture of unsaturated or epoxidized silanes;
  from 0 to 3 weight % of a metal chelate and/or a metal alkoxide;
  a polyaddition catalyst in a proportion of 2 to 50 ppm platinum; and
  optionally, a polyorganosiloxane resin containing vinyl.

35. The emulsion of claim 34, wherein the polyorganosiloxane resin has the MDQ structure.

36. The emulsion of claim 1, wherein the polydiorganosiloxane forms the elastomer by polycondensation and the emulsion is formed from a mixture comprising:
  from 0 to 80 weight % of a dispersion of colloidal silica in a hydroxylated silicone oil, wherein the dispersion comprises 10 to 50% silica;
  from 10 to 90 weight % of an α,ω-dihydroxylated oil having a hydroxyl group content of between 0.1 and 20 meq/100 g;
  from 10 to 40 weight % of an MQ resin having a hydroxyl group content of between 30 and 200 meq/100 g.
  from 0 to 5 weight % of an amino or epoxictized silane; and
  1 to 10 weight % of a polycondensation catalyst.

37. A kit for preparing the aqueous polyorganosiloxane emulsion of claim 1, comprising two parts, the first part comprising the polydiorganosiloxane emulsified in the aqueous protective hydrocolloid solution, the second part comprising the catalyst emulsified in the aqueous protective hydrocolloid solution, wherein when the first part and the second part are mixed, they form the precursor of the elastomer.

38. A method of preparing the emulsion of claim 1, comprising preparing the silicone phase by mixing the polydiorganosiloxane with the catalyst, optionally the crosslinking agent, and optionally the inorganic filler and emulsifying the silicone phase in the aqueous protective hydrocolloid solution.

39. A method of preparing the emulsion of claims 1, comprising:
  preparing a first precursor emulsion by emulsifying the polydiorganosiloxane in the protective hydrocolloid solution;
  preparing a second precursor emulsion by emulsifying the catalyst in the protective hydrocolloid solution; and
  mixing the first precursor emulsion and the second precursor emulsion;
  wherein the first precursor emulsion and the second precursor emulsion are stored separately prior to mixing.

40. A process for coating a textile with an elastomer layer, comprising applying the emulsion of claim 1 to one or both sides of the textile, and crosslinking the polydiorganosiloxane so as to obtain the textile coated with the elastomer layer.

41. The process of claim 40, wherein the elastomer layer is less than 40 g/m$^2$.

42. The process of claim 41, wherein the elastomer layer is between 5 and 40 g/m$^2$.

43. The process of claim 40, wherein the application of the emulsion to the textile is carried out with a doctor or by padding.

44. The coated textile obtained from the process of claim 40.

* * * * *